United States Patent

Gullickson

Patent Number: 5,683,094
Date of Patent: Nov. 4, 1997

[54] UNIVERSAL, ENERGY-ABSORBENT TRAILER HITCH

[75] Inventor: Russell C. Gullickson, Laurel, Mont.

[73] Assignees: Jeffrey Gullickson, Hubertus, Wis.; Randal K. Gullickson, Butler, Pa.

[21] Appl. No.: 767,245

[22] Filed: Dec. 13, 1996

[51] Int. Cl.$^6$ ........................................ B60D 1/50
[52] U.S. Cl. ................................ 280/485; 280/513
[58] Field of Search ................................ 280/439, 440, 280/483, 484, 485, 486, 488, 489, 504, 511, 513, 423.1, 425.2, 441.2, 506

[56] References Cited

U.S. PATENT DOCUMENTS

| | | | |
|---|---|---|---|
| 1,636,295 | 7/1927 | Dempsey | 280/513 |
| 2,516,555 | 7/1950 | Dear | 280/511 |
| 2,549,178 | 4/1951 | Dear | 280/511 |
| 2,878,036 | 3/1959 | Simmons | 280/485 |
| 4,978,133 | 12/1990 | Thorne et al. | 280/486 X |
| 5,482,309 | 1/1996 | Hollis | 280/511 X |

FOREIGN PATENT DOCUMENTS 249425  7/1926  Italy ........................................ 280/483

Primary Examiner—Kevin Hurley
Attorney, Agent, or Firm—Salzman & Levy

[57] ABSTRACT

The present invention features an energy-absorbent, hitching mechanism for towing trailers and other vehicles by pickup trucks or other tow vehicles. This is a mechanism of the universal type, in which energy absorption is achieved for all transverse and orthogonal forces, including force vectors in the vertical, lateral and longitudinal axes, i.e., the X, Y and Z axes of movement. The hitching mechanism has a housing for receiving a hitch ball that is attached to a tow vehicle. The ball is free to move within a chamber of the housing, subject to cushion forces described below, in any orthogonal direction, i.e., along the X, Y and/or Z axes. The housing chamber contains an energy-absorbent, dome-shaped pad that cushions the hitch ball. When the ball presses against the pad from any direction, the energy of any transverse force is absorbed by the pad, which expands into at least part of the housing chamber. A slide bar that is supported by the housing engages the neck portion of the ball, anchoring the ball for movement within the padded housing chamber. The slide bar is locked against slidable movement by a spring-biased locking pin, with the spring-biasing forcing the pin to seat within a detent hole in the housing, after it has passed through the slide bar. The locking pin is pulled upward against the biasing to release the slide bar, which in turn can be slid outwardly to release the shank of the hitch ball.

18 Claims, 5 Drawing Sheets 5,683,094

UNIVERSAL, ENERGY-ABSORBENT TRAILER HITCH

FIELD OF THE INVENTION

The present invention pertains to energy-absorbent, trailer-hitch mechanisms and, more particularly, to an energy-absorbent, trailer-hitch device that allows for universal and/or orthogonal movement of the trailer in relation to the tow vehicle, with the latter absorbing the kinetic energy from forces in all directions that is produced by such movement.

BACKGROUND OF THE INVENTION

The use of ball-type hitches for towing is well known. The hitch ball has as its purpose to vector the forces of an vehicle, such as a pickup truck, into a force that provides a forward pull to a trailer. Thus, forward, backward, sideward and vertical movements are converted through the ball to provide a steady, pulling force to a trailer being towed by a tow vehicle.

In theory, hitch balls are meant to provide a smooth transition of force, so that jolting and/or uneven pushing and pulling are eliminated or reduced. In practice, however, inertial effects, uneven road surfaces, wind and other extraneous force vectors make such a transition of force uneven and imbalanced.

It has recently been suggested that a hitch be cushioned by elastomeric materials, so as to absorb transverse force vectors. Thus, the absorption of these transverse forces is designed to eliminate or greatly reduce any jolting and/or swaying movement. Generally, such absorption devices are cumbersome and difficult to assemble. More recently, an "Energy Dampening Drawbar" was invented by GULLICKSON (as illustrated in U.S. Pat. No. 5,380,030, which issued on Jan. 10, 1995, hereby incorporated by reference), wherein the connection between a hitch ball and the trailer coupling of the invention is cushioned by an elastomeric material, as a pickup truck pulls or pushes the trailer. One of the handy features of this device is that it is simple to assemble.

While the above-identified, patented device works well, it does not, however, cushion all of the extraneous forces to which the hitching mechanism is subjected, especially when the load being towed exceeds the weight of the tow vehicle itself. The cushioning being produced by this mechanism is directed along a longitudinal axis, and does not take into account vertical or sideways movements.

One of the purposes of the current invention, on the other hand, is to provide a universal-type hitch that will absorb energy along all three orthogonal axes of movement, i.e., vertical, lateral and longitudinal.

The present invention features an absorbent, goosenecked, elastomeric, hitching device that allows freedom of movement in all directions and absorbs the energy of jolting forces in various directions.

Another objective of the current invention is to provide an energy-absorbent, hitching mechanism that is simple to manufacture, low in cost and easy to assemble.

Yet another object of the current invention is to protect the drive train of the towing vehicle, reducing strain and forces thereon.

SUMMARY OF THE INVENTION

In accordance with the present invention, there is provided an energy-absorbent, hitching mechanism for towing trailers and other vehicles by automobile. This is a mechanism of the universal type, wherein energy absorption is achieved for all transverse and orthogonal forces, including force vectors in the vertical, lateral and longitudinal axes, i.e., the X, Y and Z axes of movement. The hitching mechanism comprises a housing for receiving a hitch ball that is attached to a tow vehicle. The ball is free to move within a chamber of the housing in any orthogonal direction, i.e., along the X, Y and/or Z axes. The housing chamber contains an energy-absorbent, dome-shaped pad that cushions the hitch ball. When the ball presses against the pad from any direction, the energy of any transverse force is absorbed thereby. A slide bar supported by the housing engages the neck portion of the ball, anchoring it for movement within the padded housing chamber. The slide bar is locked against slidable movement by a spring-biased locking pin, with the spring-biasing forcing the pin to seat within a detent hole in the housing, after it has passed through the slide bar. The locking pin is pulled upward against the biasing to release the slide bar, which in turn can be slid outwardly to release the shank of the hitch ball.

BRIEF DESCRIPTION OF THE DRAWINGS

A complete understanding of the present invention may be obtained by reference to the accompanying drawings, when taken in conjunction with the subsequent, detailed description, in which.

For purposes of clarity and brevity, like elements and components will bear the same numerical designations throughout the FIGURES.

DESCRIPTION OF THE PREFERRED EMBODIMENT

Generally speaking, the invention features an energy-absorbent, hitching mechanism for towing trailers by automotive vehicle. The hitching mechanism contains an energy-absorbent, elastomeric pad that is designed to receive a hitch ball that is attached to an automotive vehicle. The energy-absorbent pad is disposed within a chamber of the hitching mechanism, which movably constrains the pad and hitch ball therein. Movement of the trailer in any orthogonal direction, i.e., along the X, Y and Z axes, will cause the hitch ball to make contact with the energy-absorbent pad. Contact with the pad will diminish the jolting force transmitted by the ball, and will thus result in a smoother ride than that heretofore experienced.

Figure 1:
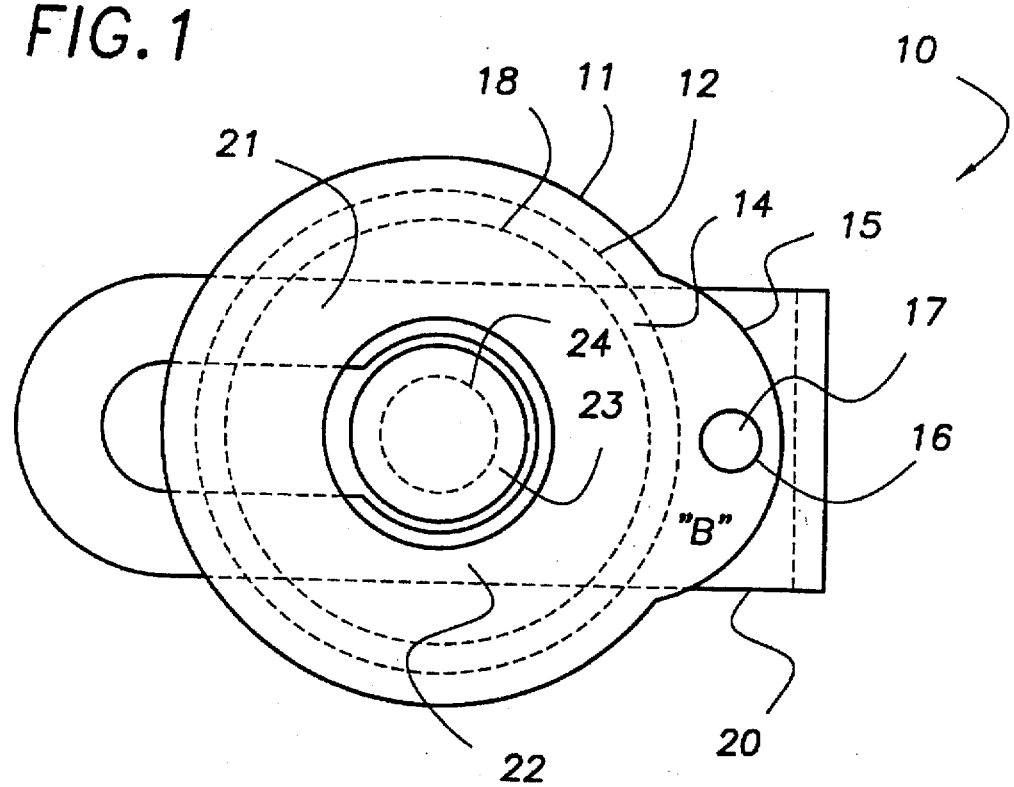
FIG. 1 illustrates a top view of the fully-assembled, energy-absorbent, hitching device of this invention.

Now referring to FIG. 1, a fully-assembled, hitching mechanism 10 of this invention is shown. The hitching mechanism 10 comprises a cylindrical housing 11. The housing 11 comprises an inner wall 12 that has an inner chamber 14, as better observed in FIG. 3. The housing 11 also includes a flanged section 15 which has an aperture 16 for receiving a locking pin 17, as also shown in FIG. 3.

Figure 3:
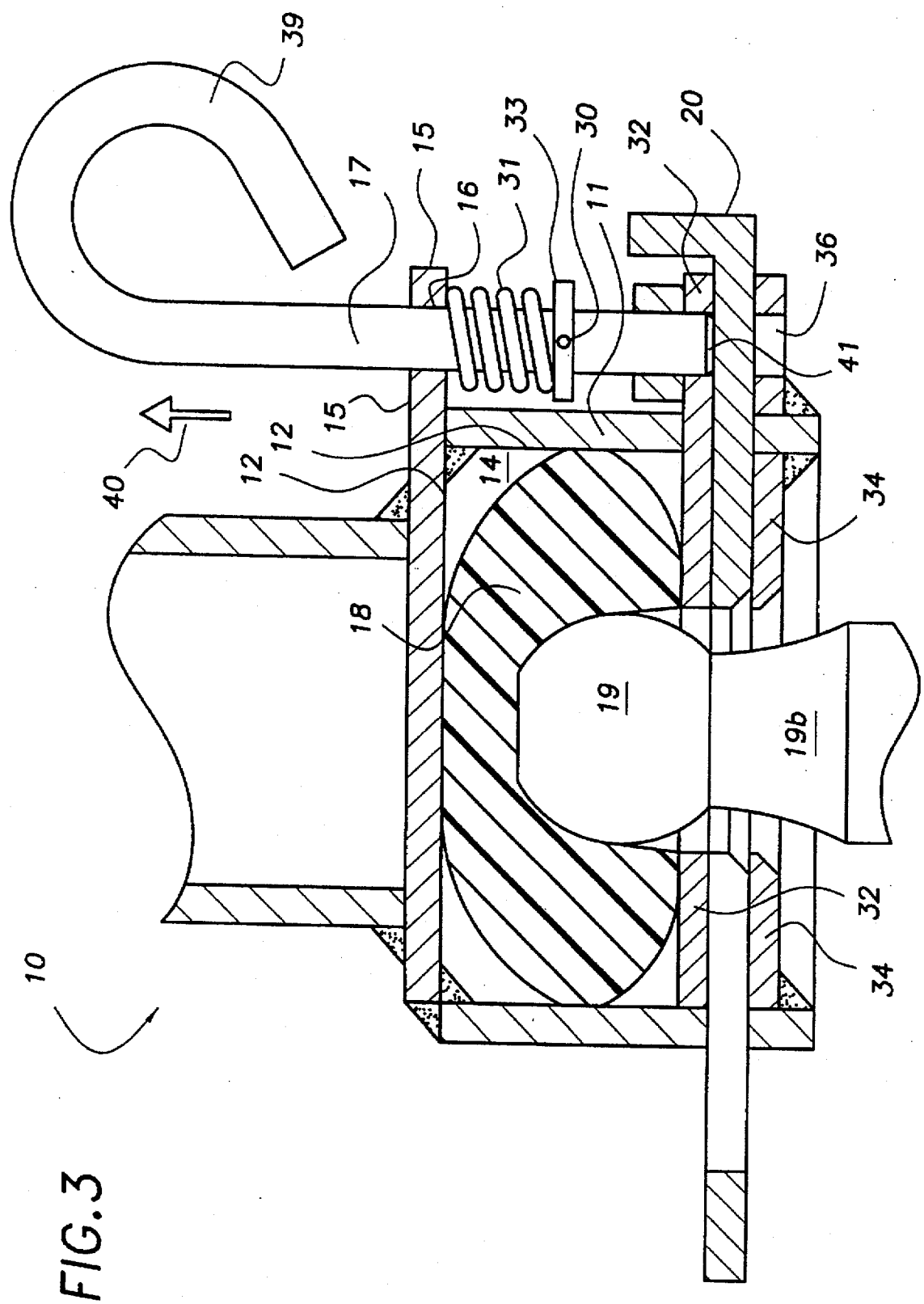
FIG. 3 shows a sectional view of the hitching device of FIG. 2, as observed along lines A—A.
Figure 4:
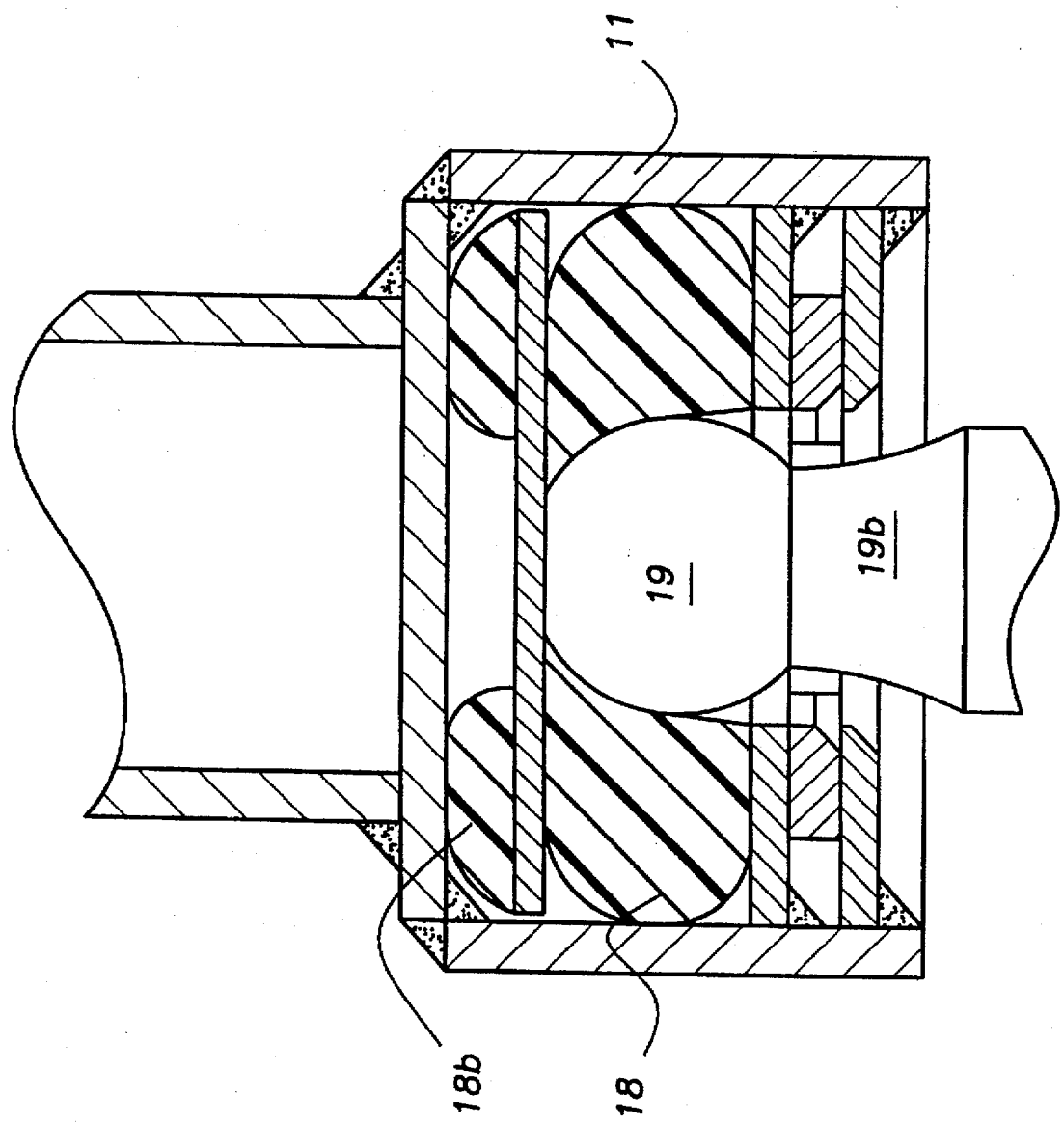
FIG. 4 illustrates a cut-away view of the elastomeric, energy-absorbent pad depicted in FIG. 3.

An energy-absorbent pad 18 is disposed in the inner chamber 14 of the housing 11, as best observed in FIGS. 3 and 4. The energy-absorbent pad 18 comprises an elastomeric material, such as polyurethane. A hollow, inner cavity 19 is disposed in the pad 18. The inner cavity 19 is designed to receive a hitch ball 19B.

Referring again to FIG. 1, a slide bar 20 is depicted in a locked position "B". The slide bar 20 has a bifurcated pair of arms 21 and 22. A slot 23 defined by the arms 21 and 22 of slide bar 20 is designed to engage about the neck 24 of the hitch ball. The engagement of the arms 21 and 22 about the neck 24 secures the hitch ball within the cavity 14 of the housing 11.

Figure 2:
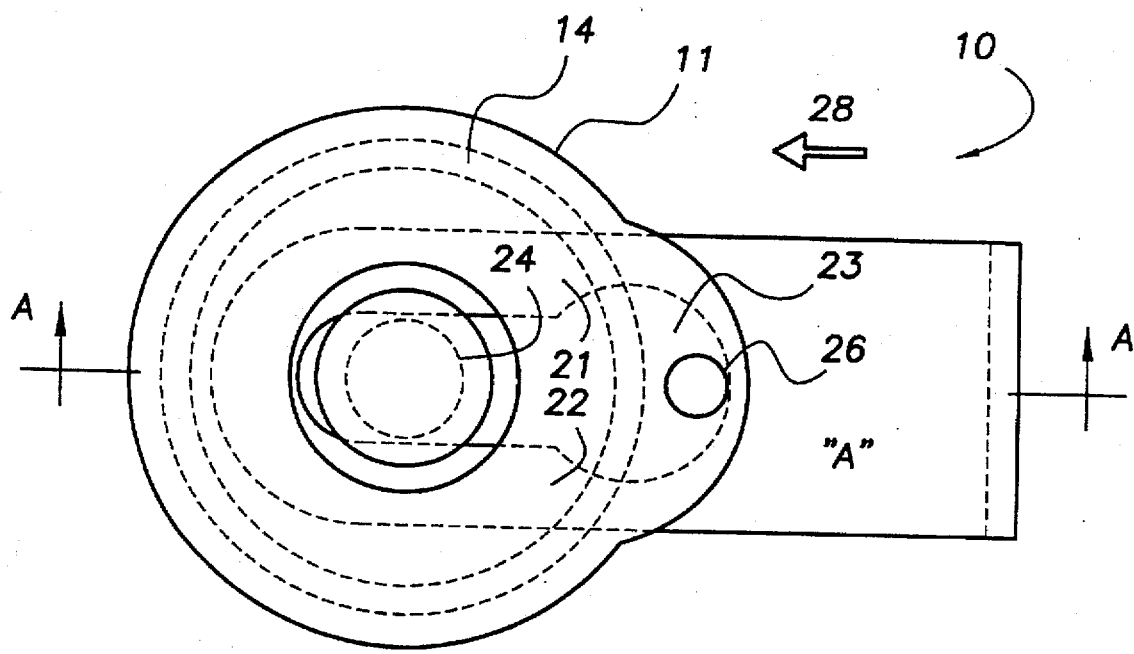
FIG. 2 depicts a top view of the hitching device of FIG. 1, shown in a disassembled position.

Referring to FIG. 2, the slide bar 20 is shown in its unlocked position "A". It is moved toward the inner chamber 14 of the housing 11, as shown by arrow 28. The inner movement of the slide bar 20 is designed to have a keyhole-type slot adapted to engage the neck 24 of the hitch ball, thus securing the hitch ball within the housing 11, as aforementioned. The slide bar 20 comprises an aperture 26 that aligns with the housing aperture 16, when the slide bar 20 is moved to locked position "B" (FIG. 1). In this position, the aligned apertures 16 and 26 allow for the slide bar 20 to be locked into position "B" by the locking pin 17 via locking well 36.

Referring to FIG. 3, the alignment of holes 16 and 26 allows for the locking pin 17 to be passed through these holes into a locking well 36 disposed in the lower housing flange 34. The slide bar 20 is guided into the inner chamber 14 of the housing 11 by means of respective upper and lower housing flanges 32 and 34. The locking pin 17 is biased toward the locking well 36 by a coil spring 31, which is held in place by a bracket 33 that is affixed to the pin 17 by fixture pin 30. The spring 31 is held against the flange 15. The locking pin 17 comprises a handle portion 39, which allows for pulling upward (arrow 40) on the pin 17, to withdraw the nose 41 of the pin from the locking well 36, against the biasing force provided by the coil spring 31.

The energy-absorbent, hitching device 10 of this invention allows for the hitch ball to move freely within the inner cavity 19 of the energy-absorbent pads 18 and 18B. Therefore, the pads 18 and 18B will cushion the forces induced by the trailer upon the hitch ball 19B that is attached to the tow vehicle, not shown.

Figure 5:
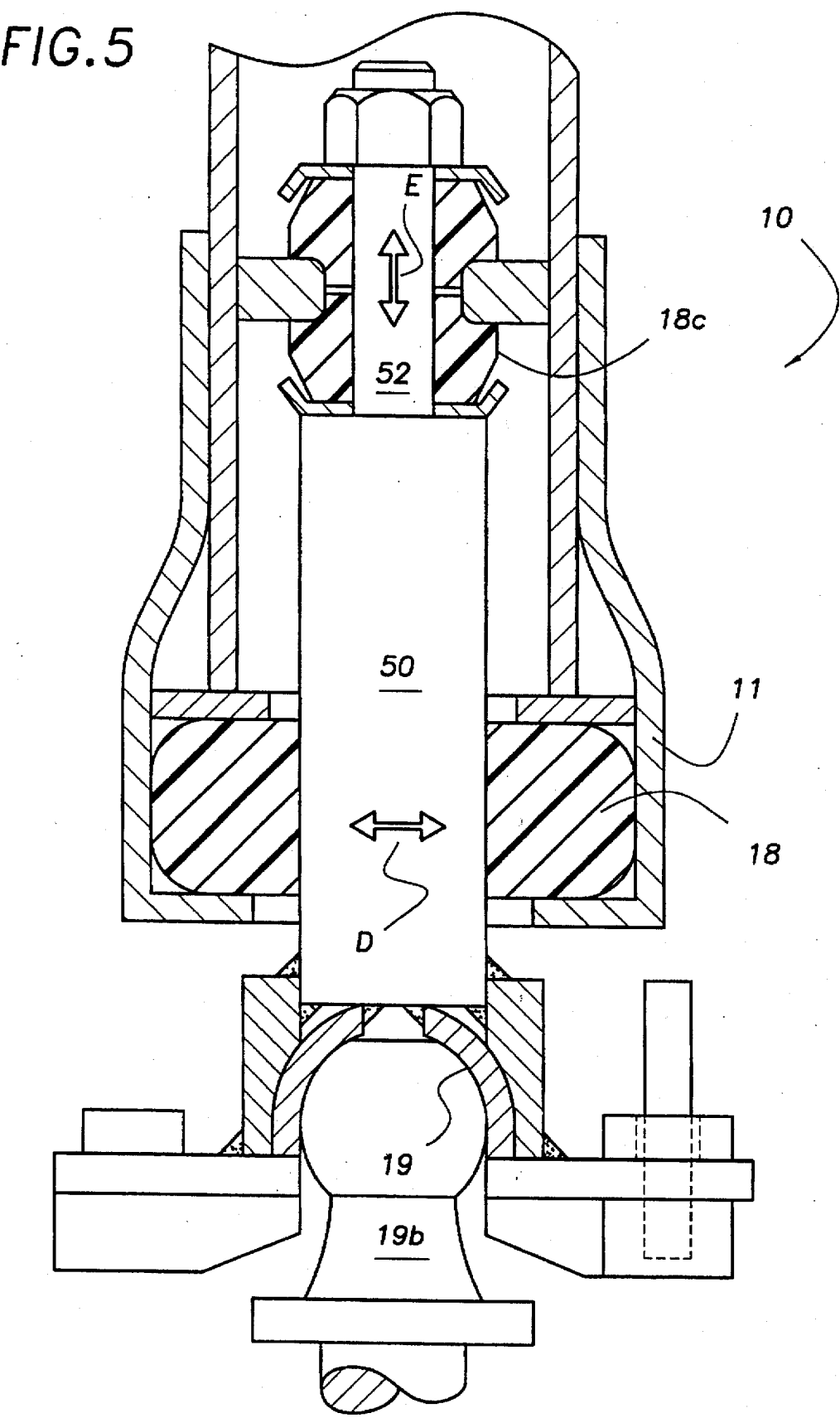
FIGS. 5 and 6, respectively, illustrate sectional views of an alternative embodiment of the invention, in which forces on, and movement of, the components are shown with the aid of appropriate arrows.
Figure 6:
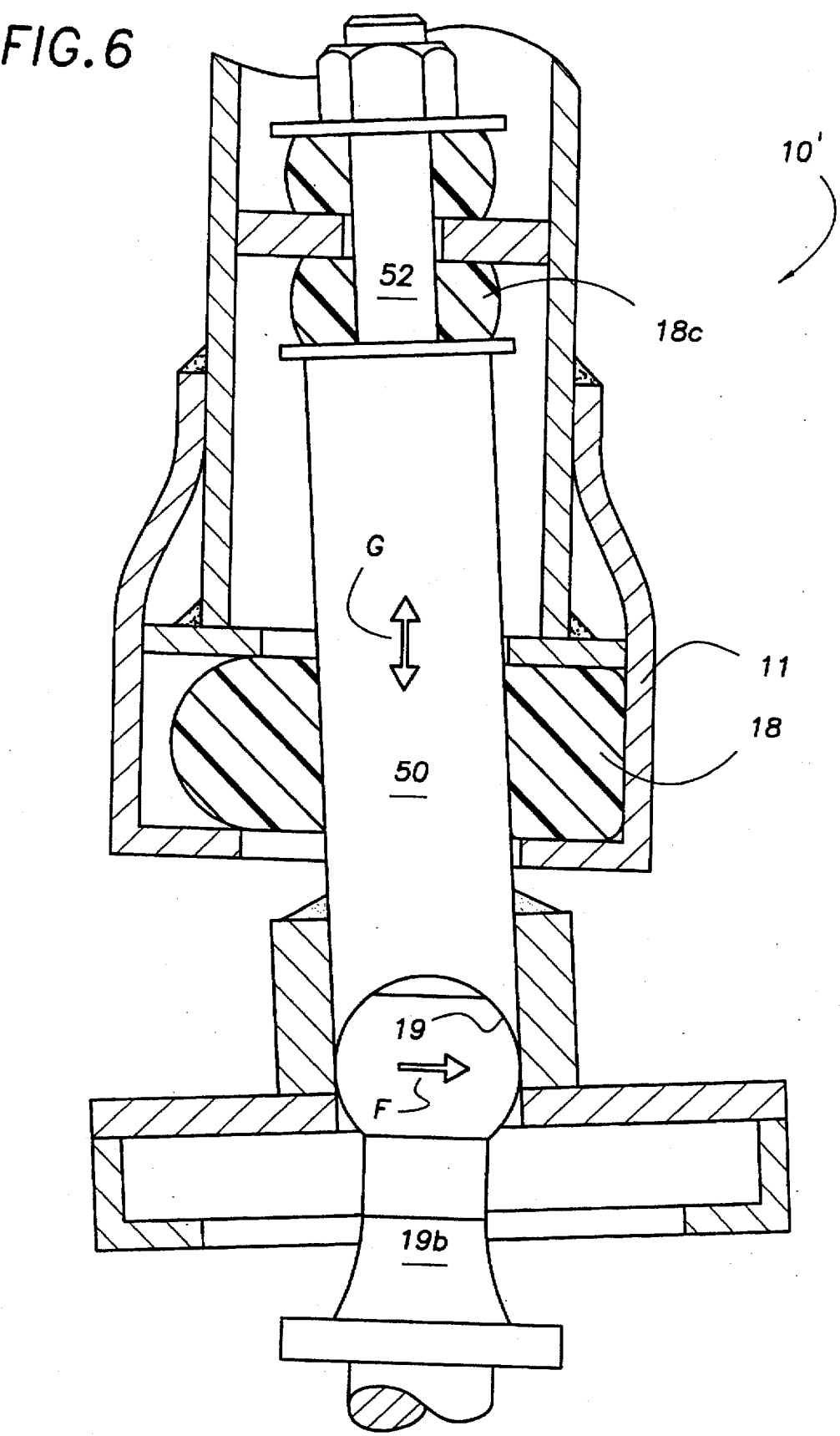

Referring now also to FIGS. 5 and 6, there are shown views of an alternative embodiment of the invention, in which forces on, and movement of, the components are shown with the aid of appropriate arrows. The apparatus depicted in these FIGURES is intended to be used in the same environment, with a similar housing, as the environment and housing shown in the previously-described embodiment of the invention.

The hitching mechanism 10' once again comprises a cylindrical housing 11. The energy-absorbent pad 18 is displaced upstream from the hitch ball cavity 19 in this embodiment. An additional energy-absorbent pad 18c is provided further upstream of the hitch ball 19B. The lower end of a cylindrical shaft 50, having a relatively large diameter, is operatively connected to hitch ball cavity 19. Connected to the opposite, upper end of cylindrical shaft 50, in turn, is a second cylindrical shaft 52, having a diameter less than the diameter of cylindrical shaft 50. Surrounding second shaft 52 is another pad of energy-absorbent material 18c.

Thus, it can be seen that lateral movement (arrow "D") of cylindrical shaft 50 can be minimized and the energy relating to it can be absorbed, by resilient material 18. Moreover, resilient material 18c is used to absorb energy and limit vertical movement (arrow "E") of second shaft 52.

In the case of lateral movement (arrow "F") of a hitch ball 19B (as much as ¾ of displacement), it may be observed (FIG. 6) that cylindrical shafts 50 and 52 are capable of skewing (arrow "G"). Such movement is also susceptible to the energy-dampening functions of the invention, due, once again, to the energy-absorbent material 18 and 18c, respectively.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. A universal, energy-absorbent, hitching device, comprising:

a cylindrically-shaped housing, having an inner chamber for receiving a hitch ball;

a cushioning pad disposed within said inner chamber of said housing, said cushioning pad having an inner cavity for supporting said hitch ball and absorbing energy transferred by said hitch ball from forces vectored in orthogonal directions;

a slide bar slidably mounted in said housing, and movable between a locked position and an unlocked position, said slide bar engaging a neck portion of said hitch ball in its locked position to secure said hitch ball into said inner chamber of said housing;

a locking pin passing through said slide bar into a locking well disposed in said housing when said locking pin is in its locked position, said locking pin securing said slide bar in its locked position; and biasing means disposed between said locking pin and said housing for biasing said locking pin into its locking position with respect to said housing.

2. The universal, energy-absorbent, hitching device in accordance with claim 1, wherein said cushioning pad is substantially dome-shaped.

3. The universal, energy-absorbent, hitching device in accordance with claim 1, wherein said biasing means comprises a coil spring.

4. The universal, energy-absorbent, hitching device in accordance with claim 1, wherein said slide bar comprises a bifurcated section, including a slot, that engages said neck portion of said hitch ball.

5. The universal, energy-absorbent, hitching device in accordance with claim 1, further comprising a flange section disposed upon said housing, said flange section guiding said slide bar for movement between its locked position and its unlocked position.

6. The universal, energy-absorbent, hitching device in accordance with claim 1, wherein said cushioning pad comprises an elastomeric material.

7. The universal, energy-absorbent, hitching device in accordance with claim 6, wherein said elastomeric material comprises polyurethane.

8. The universal, energy-absorbent, hitching device in accordance with claim 6, wherein said cushioning pad comprises a substantially dome-shaped, inner cavity, said cushioning pad being subject to deformation under compression, so that said cushioning pad may expand to at least partially fill said inner cavity.

9. A universal, energy-absorbent, hitching device, comprising:

a cylindrically-shaped housing, having an inner chamber for receiving a hitch ball;

a cushioning pad, comprising an elastomeric material, disposed within said inner chamber of said housing, said cushioning pad having an inner cavity for supporting said hitch ball and absorbing energy transferred by said hitch ball via forces vectored in all orthogonal directions;

a slide bar slidably mounted in said housing, and movable between a locked position and an unlocked position, said slide bar engaging a neck portion of said hitch ball in its locked position to secure said hitch ball into said inner chamber of said housing;

a locking pin passing through said slide bar into a locking well disposed in said housing when said locking pin is in its locked position, said locking pin securing said slide bar in its locked position; and biasing means disposed between said locking pin and said housing for biasing said locking pin into its locking position with respect to said housing.

10. The universal, energy-absorbent, hitching device in accordance with claim 9, wherein said cushioning pad is substantially dome-shaped.

11. The universal, energy-absorbent, hitching device in accordance with claim 9, wherein said biasing means comprises a coil spring.

12. The universal, energy-absorbent, hitching device in accordance with claim 9, wherein said slide bar comprises a keyhole, formed by a slot that engages said neck portion of said hitch ball.

13. The universal, energy-absorbent, hitching device in accordance with claim 9, further comprising a flange section disposed in said housing, said flange section guiding said slide bar for movement between its locked position and its unlocked position.

14. The universal, energy-absorbent, hitching device in accordance with claim 9, wherein said elastomeric material comprises polyurethane.

15. A universal, energy-absorbent, hitching device, comprising:

a cylindrically-shaped housing, having an inner chamber for receiving a hitch ball;

a cushioning pad, comprising an elastomeric material, disposed within said inner chamber of said housing, said cushioning pad having an inner cavity for supporting said hitch ball, and absorbing energy transferred by said hitch ball via forces vectored in all orthogonal directions;

a slide bar slidably mounted in said housing, and movable between a locked position and an unlocked position, said slide bar engaging a neck portion of said hitch ball in its locked position to secure said hitch ball into said inner chamber of said housing;

a flange section disposed in said housing, said flange section guiding said slide bar for movement between its locked position and its unlocked position;

a locking pin passing through said slide bar into a locking well disposed in said housing when said locking pin is in its locked position, said locking pin securing said slide bar in its locked position; and biasing means disposed between said locking pin and said housing for biasing said locking pin into its locking position with respect to said housing.

16. The universal, energy-absorbent, hitching device in accordance with claim 15, wherein said biasing means comprises a coil spring.

17. The universal, energy-absorbent, hitching device in accordance with claim 15, wherein said slide bar comprises a bifurcated section, including two slot sides, that engages said neck portion of said hitch ball.

18. The universal, energy-absorbent, hitching device in accordance with claim 15, wherein said elastomeric material comprises polyurethane.

* * * * *